US012659224B2

(12) United States Patent
Gao et al.

(10) Patent No.: US 12,659,224 B2
(45) Date of Patent: Jun. 16, 2026

(54) PARAMETER CONFIGURATION METHOD AND APPARATUS, CONTROLLER, COMMUNICATION DEVICE, AND COMMUNICATION SYSTEM

(71) Applicant: HUAWEI TECHNOLOGIES CO., LTD., Shenzhen (CN)

(72) Inventors: Tao Gao, Beijing (CN); Tongtong Wang, Beijing (CN); Jiayi Zhang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 12 days.

(21) Appl. No.: 18/399,363

(22) Filed: Dec. 28, 2023

(65) Prior Publication Data

US 2024/0137272 A1      Apr. 25, 2024

Related U.S. Application Data

(63) Continuation of application No. PCT/CN2022/101592, filed on Jun. 27, 2022.

(30) Foreign Application Priority Data

Jun. 30, 2021    (CN) ......................... 202110736044.0
Oct. 14, 2021    (CN) ......................... 202111197708.7

(51) Int. Cl.
*H04L 41/0813*        (2022.01)
*H04L 41/083*         (2022.01)
*H04L 41/0896*        (2022.01)

(52) U.S. Cl.
CPC ........ *H04L 41/0813* (2013.01); *H04L 41/083* (2013.01); *H04L 41/0896* (2013.01)

(58) Field of Classification Search
CPC ............. H04L 41/0803; H04L 41/0813; H04L 41/083; H04L 41/0896

(Continued)

(56) References Cited

U.S. PATENT DOCUMENTS 7,633,972 B1 * 12/2009 Elliott ..................... H04L 47/43
                                                     370/476
11,095,543 B1 * 8/2021 Iglesias ............... H04L 43/0817

(Continued)

FOREIGN PATENT DOCUMENTS

CN          105208585 A     12/2015
WO     WO-2019120683 A1 *  6/2019

OTHER PUBLICATIONS

1 Xu Zhang et al., "SDN-based Resilience Solutions for Smart Grids," XP032917383, May 23, 2016, total 5 pages.

*Primary Examiner* — Ruolei Zong
(74) *Attorney, Agent, or Firm* — WOMBLE BOND DICKINSON (US) LLP

(57)          ABSTRACT

This application discloses a parameter configuration method and apparatus, a controller, a communication device, and a communication system, and pertains to the field of communication technologies. The method includes: obtaining a data transmission quality parameter of a service; obtaining a forwarding capability parameter of a communication device; determining a configuration parameter of the communication device based on the data transmission quality parameter and the forwarding capability parameter; and sending the configuration parameter to the communication device. According to this application, a data transmission quality requirement of a service can be met.

20 Claims, 7 Drawing Sheets

(58) Field of Classification Search
USPC ......................................................... 709/220
See application file for complete search history.

(56)                     References Cited

U.S. PATENT DOCUMENTS

| | | | | |
|---|---|---|---|---|
| 2003/0076849 A1* | 4/2003 | Morgan | ............. | H04Q 11/0478 |
| | | | | 370/412 |
| 2004/0165598 A1* | 8/2004 | Shrimali | ............... | H04L 49/254 |
| | | | | 370/395.42 |
| 2006/0104232 A1* | 5/2006 | Gidwani | .............. | H04W 28/18 |
| | | | | 370/328 |
| 2012/0230348 A1* | 9/2012 | Pannell | ................. | H04L 47/245 |
| | | | | 370/437 |
| 2014/0071823 A1* | 3/2014 | Pannell | ................... | H04L 47/36 |
| | | | | 370/230.1 |
| 2016/0006606 A1* | 1/2016 | Zhu | ..................... | H04L 41/0803 |
| | | | | 370/338 |
| 2016/0323189 A1 | 11/2016 | Ahn et al. | | |
| 2018/0343644 A1* | 11/2018 | Liu | ........................ | H04L 1/0025 |
| 2019/0104055 A1* | 4/2019 | Craciunas | ............... | H04L 47/28 |
| 2019/0116129 A1* | 4/2019 | Wang | .................. | H04L 41/5022 |
| 2019/0199641 A1* | 6/2019 | Lo Bello | ................. | H04L 47/22 |
| 2019/0199646 A1* | 6/2019 | Singh | ................... | H04W 72/12 |
| 2020/0169972 A1* | 5/2020 | Marce | ................... | H04L 47/283 |
| 2021/0320851 A1* | 10/2021 | Albrecht | ................ | H04L 65/80 |
| 2022/0386321 A1* | 12/2022 | Ikeda | ................... | H04W 72/54 |

* cited by examiner

Multiframe

| Type C service priority | Type B service priority | Type A service priority |
|---|---|---|

1000

Communication device

Main control board 1010

Central processing unit 1011

Memory 1012

Interface board 1030

Central processing unit 1031

Forwarding entry memory 1034

Physical interface card 1033

Network processor 1032

Switching board 1020

Interface board 1040

Central processing unit 1041

Forwarding entry memory 1044

Physical interface card 1043

Network processor 1042

FIG. 10

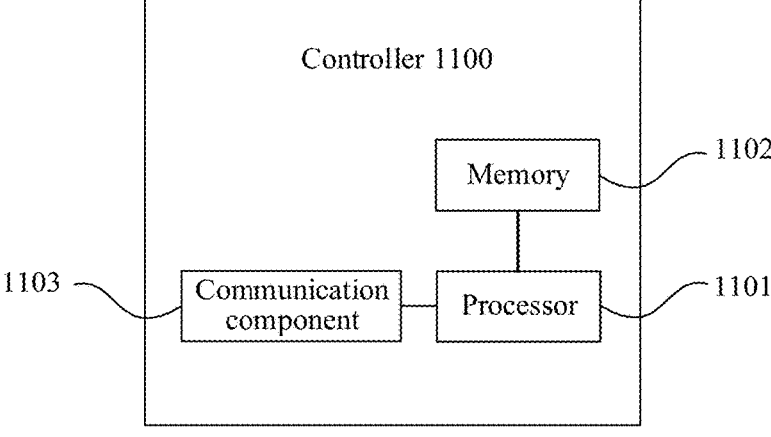

Controller 1100

Memory                    1102

1103    Communication component    Processor    1101

FIG. 11

PARAMETER CONFIGURATION METHOD AND APPARATUS, CONTROLLER, COMMUNICATION DEVICE, AND COMMUNICATION SYSTEM

CROSS-REFERENCE TO RELATED APPLICATIONS

This application is a continuation of International Application No. PCT/CN2022/101592, filed on Jun. 27, 2022, which claims priority to Chinese Patent Application No. 202110736044.0, filed on Jun. 30, 2021 and Chinese Patent Application No. 202111197708.7, filed on Oct. 14, 2021. All of the aforementioned applications are hereby incorporated by reference in their entireties.

TECHNICAL FIELD

This application relates to the field of communication technologies, and in particular, to a parameter configuration method and apparatus, a controller, a communication device, and a communication system.

BACKGROUND

With continuous development of communication technologies, a network needs to carry increasingly more services. Usually, the network includes an edge device and a forwarding device. The edge device is configured to connect user equipment to the network, and the forwarding device is configured to forward service data.

Before the network is put into use, a technician needs to configure the edge device and the forwarding device in the network. When configuring the edge device and the forwarding device, the technician usually obtains configuration parameters based on experience of the technician, and delivers the configuration parameters to the edge device and the forwarding device one by one.

The technician determines the configuration parameters based only on past experience. Such a method for configuring the edge device and the forwarding device cannot meet data transmission quality requirements of various services in the network.

SUMMARY

Embodiments of this application provide a parameter configuration method and apparatus, a controller, a communication device, and a communication system, to resolve a problem in the conventional technology that a parameter configuration method cannot meet data transmission quality requirements of various services in a network. The technical solutions are as follows:

According to a first aspect, a parameter configuration method is provided. The method is applied to a controller. In an embodiment, the method includes: obtaining a data transmission quality parameter of a service; obtaining a forwarding capability parameter of a communication device; determining a configuration parameter of the communication device based on the data transmission quality parameter and the forwarding capability parameter; and sending the configuration parameter to the communication device.

In the solution provided in embodiments of this application, a user delivers a data transmission quality requirement of the service to the controller based on an actual situation. The controller may collect forwarding capability parameters of communication devices in a network. In an embodiment, the controller may send forwarding capability parameter obtaining instructions to the communication devices in the network by using a preset communication protocol. After receiving the forwarding capability parameter obtaining instruction, the communication device may also report the forwarding capability parameter of the communication device to the controller by using the preset communication protocol. Then, the controller determines the configuration parameter of the communication device based on the forwarding capability parameter of the communication device and the data transmission quality requirement of the service.

In the parameter configuration method provided in embodiments of this application, the configuration parameter is not configured based only on experience of a technician, but is configured based on an actual service requirement of the user, so that the data transmission quality requirement of the service can be better ensured.

In an embodiment, the configuration parameter includes one or more of a preset packet length, a correspondence between the service and a service priority, and a queue configuration parameter.

In an embodiment, the queue configuration parameter includes one or more of a base frame length, a multiframe length, and a service volume proportion corresponding to the service priority. The base frame length indicates a maximum length of a packet forwarded by a queue at a time, and a multiframe length indicates a maximum length of a packet forwarded by all queues in a forwarding periodicity.

In an embodiment, the queue configuration parameter includes one or more of a forwarding periodicity length, a time slice length, a time slice quantity, a queue weight, a quantity of queues that corresponds to the service priority, and a queue shaping parameter.

In an embodiment, the data transmission quality parameter includes an upper latency limit and an upper jitter limit.

In an embodiment, the forwarding capability parameter includes a bandwidth of an egress port and/or a quantity of queues on the egress port.

In an embodiment, processing of determining the configuration parameter of the communication device may be: determining the service priority of the service based on the upper latency limit of the service and the upper jitter limit of the service; and determining the queue configuration parameter of the communication device based on the upper latency limit corresponding to the service priority, the upper jitter limit corresponding to the service priority, the bandwidth of the egress port of the communication device, and the preset packet length.

According to a second aspect, a parameter configuration method is provided. The method is applied to a communication device, and the method includes: receiving a configuration parameter sent by a controller, the configuration parameter includes one or more of a preset packet length, a correspondence between a service and a service priority, and a queue configuration parameter; and performing configuration based on the configuration parameter.

In an embodiment, the queue configuration parameter includes one or more of a base frame length, a multiframe length, and a service volume proportion corresponding to the service priority. The base frame length indicates a maximum length of a packet forwarded by a queue at a time, and a multiframe length indicates a maximum length of a packet forwarded by all queues in a forwarding periodicity.

In an embodiment, the queue configuration parameter includes one or more of a forwarding periodicity length, a time slice length, a time slice quantity, a queue weight, a quantity of queues that corresponds to the service priority, and a queue shaping parameter.

In an embodiment, a data transmission quality parameter includes an upper latency limit and an upper jitter limit.

In an embodiment, a forwarding capability parameter includes a bandwidth of an egress port and/or a quantity of queues on the egress port.

According to a third aspect, a parameter configuration apparatus is provided, and the apparatus includes:

an obtaining module, configured to obtain a data transmission quality parameter of a service, and obtain a forwarding capability parameter of a communication device;

a determining module, configured to determine a configuration parameter of the communication device based on the data transmission quality parameter and the forwarding capability parameter; and a sending module, configured to send the configuration parameter to the communication device.

In an embodiment, the configuration parameter includes one or more of a preset packet length, a correspondence between the service and a service priority, and a queue configuration parameter.

In an embodiment, the queue configuration parameter includes one or more of a base frame length, a multiframe length, and a service volume proportion corresponding to the service priority. The base frame length indicates a maximum length of a packet forwarded by a queue at a time, and a multiframe length indicates a maximum length of a packet forwarded by all queues in a forwarding periodicity.

In an embodiment, the queue configuration parameter includes one or more of a forwarding periodicity length, a time slice length, a time slice quantity, a queue weight, a quantity of queues that corresponds to the service priority, and a queue shaping parameter.

In an embodiment, the data transmission quality parameter includes an upper latency limit and an upper jitter limit.

In an embodiment, the forwarding capability parameter includes a bandwidth of an egress port and/or a quantity of queues on the egress port.

In an embodiment, the determining a configuration parameter of the communication device based on the data transmission quality parameter and the forwarding capability parameter includes:

determining the service priority of the service based on the upper latency limit of the service and the upper jitter limit of the service; and determining the queue configuration parameter of the communication device based on the upper latency limit corresponding to the service priority, the upper jitter limit corresponding to the service priority, the bandwidth of the egress port of the communication device, and the preset packet length.

According to a fourth aspect, a parameter configuration apparatus is provided. The apparatus is applied to a communication device and includes:

a receiving module, configured to receive a configuration parameter sent by a controller, where the configuration parameter includes one or more of a preset packet length, a correspondence between a service and a service priority, and a queue configuration parameter; and a configuration module, configured to perform configuration based on the configuration parameter.

According to a fifth aspect, a controller is provided. The controller includes a processor and a memory, the memory stores at least one instruction, and the at least one instruction is loaded and executed by the processor to implement the parameter configuration method according to the first aspect.

According to a sixth aspect, a communication device is provided. The communication device includes a processor and a memory, the memory stores at least one instruction, and the at least one instruction is loaded and executed by the processor to implement the parameter configuration method according to the second aspect.

According to a seventh aspect, a communication system is provided. The communication system includes the controller according to the fifth aspect, a first communication device according to the sixth aspect, and a second communication device according to the sixth aspect.

In an embodiment, a transmission path of a service includes the first communication device and the second communication device.

In an embodiment, a forwarding capability parameter of the first communication device is different from a forwarding capability parameter of the second communication device, and a configuration parameter received by the first communication device is different from a configuration parameter received by the second communication device.

According to an eighth aspect, a computer-readable storage medium is provided, including instructions. When the computer-readable storage medium is run on a controller, a controller device is enabled to perform the parameter configuration method according to the first aspect.

According to a ninth aspect, a computer-readable storage medium is provided, including instructions. When the computer-readable storage medium is run on a communication device, the communication device is enabled to perform the parameter configuration method according to the second aspect.

According to a tenth aspect, a computer program product is provided, including instructions. When the computer program product is run on a controller, the controller is enabled to perform the parameter configuration method according to the first aspect.

According to an eleventh aspect, a computer program product is provided, including instructions. When the computer program product is run on a communication device, the communication device is enabled to perform the parameter configuration method according to the second aspect.

BRIEF DESCRIPTION OF DRAWINGS

FIG. 10 is a schematic structural diagram of a communication device according to an embodiment of this application; and FIG. 11 is a schematic structural diagram of a controller according to an embodiment of this application.

DESCRIPTION OF EMBODIMENTS

Figure 1:
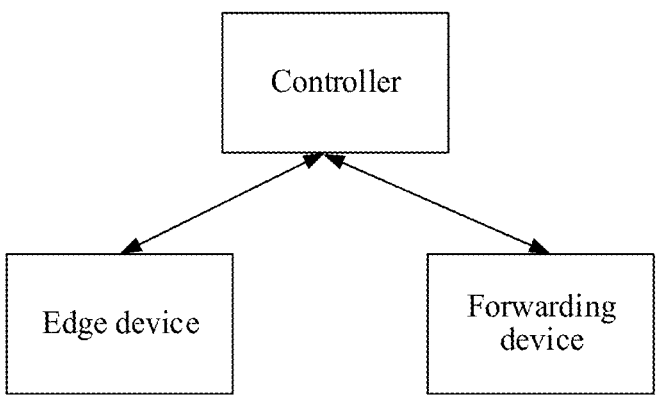
FIG. 1 is a schematic architectural diagram of a system according to an embodiment of this application.

Embodiments of this application provide a parameter configuration method. The method may be applied to a system including a controller and a communication device. In a system shown in FIG. 1, a communication device includes an edge device (PE) and a forwarding device (Provider, P). A controller collects a forwarding capability parameter of the communication device, receives a data transmission quality parameter that is of a service and that is sent by a user, and determines a configuration parameter of the communication device based on the data transmission quality parameter of the service, the forwarding capability parameter of the communication device, and a preset packet length. The communication device performs configuration based on the configuration parameter delivered by the controller, and forwards a received packet after completing the configuration.

In the parameter configuration method provided in embodiments of this application, the configuration parameter is not configured based only on experience of a technician, but is configured based on an actual service requirement of the user, so that a data transmission quality requirement of the service can be better ensured.

The following describes several terms used in this application.

1. An access flow packet is a packet whose previous hop is an edge device.

2. A pass-through flow packet is a packet whose previous hop is a forwarding device.

In an embodiment, whether a packet is an access flow packet or a pass-through flow packet may be determined based on an ingress port of the packet. The ingress port is connected to a previous-hop device, and it may be determined, by using the ingress port, whether a previous hop is an edge device or a forwarding device. If the previous hop is a forwarding device, it is determined that the packet received by the ingress port is a pass-through flow packet. If the previous hop is an edge device, it is determined that the packet received by the ingress port is an access flow packet.

For example, a port 1 and a port 2 are connected to an edge device, and a port 3 and a port 4 are connected to a forwarding device. If the ingress port of the packet is the port 1 or the port 2, it is determined that the packet is an access flow packet. If the ingress port of the packet is the port 3 or the port 4, it is determined that the packet is a pass-through flow packet.

Figure 2:
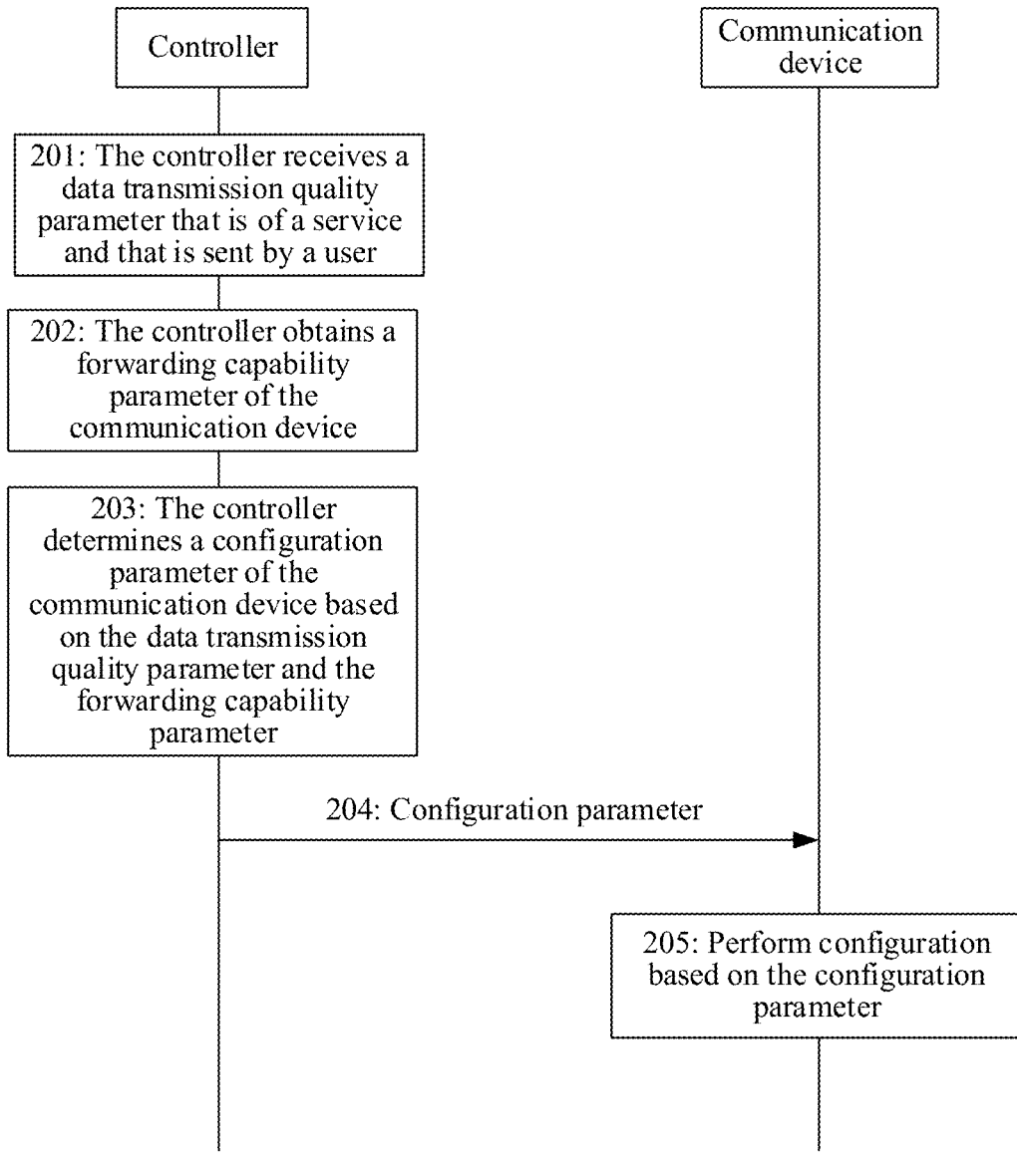
FIG. 2 is a flowchart of a parameter configuration method according to an embodiment of this application.

With reference to FIG. 2, the following describes a parameter configuration method provided in embodiments of this application. A processing procedure of the method may include the following operations.

Operation 201: A controller receives a data transmission quality parameter that is of a service and that is sent by a user.

The data transmission quality parameter may include an upper latency limit and an upper jitter limit. The upper latency limit refers to a maximum latency allowed by the service, and the upper jitter limit refers to a maximum jitter allowed by the service.

In an embodiment, the user may deliver a data transmission quality requirement of the service to the controller by using a terminal device. Alternatively, the user may log in to a command window of the controller and enter the transmission quality parameter of the service by using a command.

The data transmission quality requirement of the service may have a plurality of different cases. The following lists several cases for description.

Case 1: The data transmission quality requirement of the service may be a data transmission quality requirement of one or more services.

In this case, the data transmission quality requirement may include a correspondence between a service identifier, a data transmission quality parameter, and a periodic burst data volume. The periodic burst data volume refers to a volume of data sent within fixed duration.

For example, the service may include a voice service, a video service, or a virtual reality (VR) service. In the data transmission quality requirement, a service identifier of each service corresponds to a data transmission quality parameter and a periodic burst data volume.

Case 2: The data transmission quality requirement of the service may alternatively be a data transmission quality requirement of one or more types of services.

In this case, the data transmission quality requirement may include a service type identifier, a data transmission quality parameter, and a periodic burst data volume.

For example, based on different requirements of the services on data transmission quality, the services may be classified into three types: a type A service, a type B service, and a type C service, and each type of service may include at least one service. In the data transmission quality requirement, a service identifier of each type of service corresponds to a data transmission quality parameter and a periodic burst data volume.

In addition, for Case 1, after receiving the data transmission quality requirement of the service, the controller may further determine a service priority of each service based on the data transmission quality parameter corresponding to each service.

For example, the services are classified into three types: the type A service, the type B service, and the type C service. Requirements of the various services on a latency and a jitter may be as follows:

The type A service has very high requirements on both the latency and the jitter. For example, an upper limit of the latency and an upper limit of the jitter both are required to be 10 microseconds ($\mu$s) to 100 microseconds.

The type B service has a very high requirement on the latency. For example, an upper limit of the latency is required to be 10 $\mu$s to 100 $\mu$s. The type B service has a high requirement on the jitter. For example, an upper limit of the jitter is required to be 100 $\mu$s to 10 milliseconds (ms).

The type C service has a high requirement on the latency. For example, an upper limit of the latency is required to be 100 $\mu$s to 10 ms. The type C service does not have a requirement on the jitter.

The type A service corresponds to a type A service priority, the type B service corresponds to a type B service priority, and the type C service corresponds to a type C service priority. The various service priorities are sorted as follows: the type A service priority>the type B service priority>the type C service priority.

After receiving the data transmission quality requirement of the service, if the controller determines that the upper latency limit of the service is between 10 $\mu$s and 100 $\mu$s and the upper jitter limit of the service is also between 10 $\mu$s and 100 $\mu$s, the controller determines that the service belongs to the type A service and corresponds to the type A service priority. If the controller determines that the upper latency limit of the service is between 10 μs and 100 μs and the upper jitter limit of the service is between 100 μs and 10 ms, the controller determines that the service belongs to the type B service and corresponds to the type B service priority. If the controller determines that the upper latency limit of the service is between 100 μs and 10 ms, and there is no requirement on the upper jitter limit, or the controller determines that the upper latency limit of the service is between 100 μs and 10 ms and the upper jitter limit of the service is greater than 10 ms, the controller determines that the service belongs to the type C service and corresponds to the type C service priority.

In addition, after the service priorities of the various services are determined, upper latency limits and upper jitter limits that correspond to the various service priorities may be further adjusted, and periodic burst data volumes corresponding to the various service priorities may be further determined.

In an embodiment, a method for adjusting the upper latency limits and the upper jitter limits that correspond to the various service priorities may be as follows:

For each service priority, a minimum value is selected from upper latency limits of services corresponding to the service priority as the upper latency limit corresponding to the service priority. Similarly, a minimum value is selected from upper jitter limits of the services corresponding to the service priority as the upper jitter limit corresponding to the service priority.

A method for determining the periodic burst data volumes corresponding to the various service priorities may be as follows:

For each service priority, periodic burst data volumes of services corresponding to the service priority are added to serve as the periodic burst data volume corresponding to the service priority.

For Case 2, in addition to delivering the data transmission quality requirement of the service to the controller, the user may further deliver a correspondence between a service and a service priority to the controller. Each type of service corresponds to one service priority. Correspondingly, the correspondence between the service and the service priority may be a correspondence between a service identifier and a service type identifier.

Operation 202: The controller obtains a forwarding capability parameter of a communication device. The forwarding capability parameter may include a bandwidth of an egress port of the communication device.

In an embodiment, the controller may collect forwarding capability parameters of communication devices in a network. In an embodiment, the controller may send forwarding capability parameter obtaining instructions to the communication devices in the network by using a preset communication protocol. After receiving the forwarding capability parameter obtaining instruction, the communication device may also report the forwarding capability parameter of the communication device to the controller by using the preset communication protocol. The preset communication protocol may be the Network Configuration Protocol (NETCONF), the representational state Representational State Transfer Configuration Protocol (RESTCONF), or the like.

Operation 203: The controller determines a configuration parameter of the communication device based on the data transmission quality parameter and the forwarding capability parameter.

In an embodiment, a method for determining a configuration parameter of an edge device and a method for determining a configuration parameter of a forwarding device may be the same or different.

1. When a pass-through flow packet and an access flow packet have a same priority, a method for determining a configuration parameter of an edge device may be the same as a method for determining a configuration parameter of a forwarding device.

Figure 3:
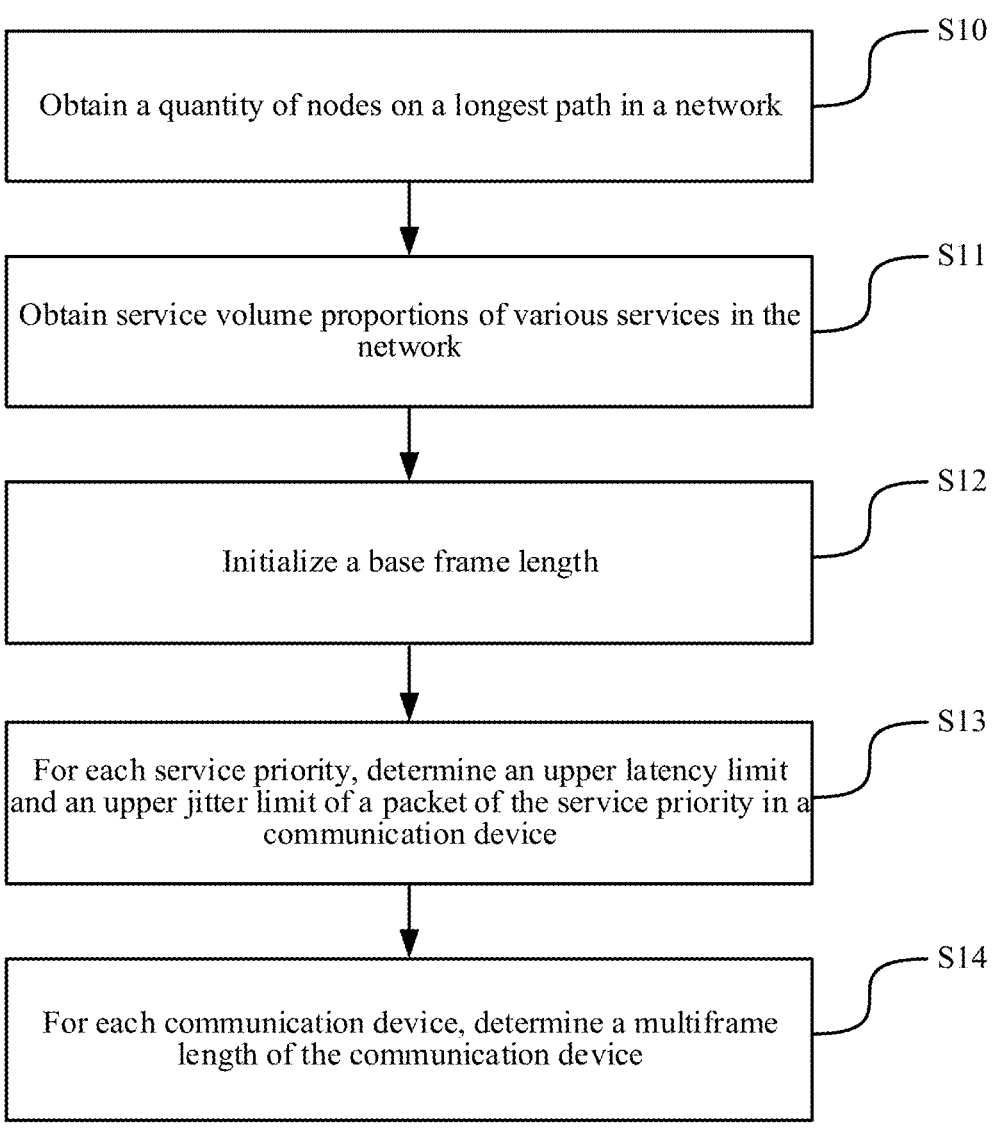
FIG. 3 is another flowchart of a parameter configuration method according to an embodiment of this application.

In addition, communication devices having same forwarding capability parameters also have same configuration parameters. Therefore, for the communication devices having the same forwarding capability parameters, a configuration parameter of only one of the communication devices may be determined. In an embodiment, refer to FIG. 3. A method for determining a configuration parameter may be as follows:

S10: Obtain a quantity of nodes on a longest path in a network.

In an embodiment, a controller collects network topology information, and determines the quantity $H_{max}$ of nodes on the longest path in the network based on the network topology information.

S11: Obtain service volume proportions of various services in the network.

In an embodiment, in a network configuration phase, a user may deliver the service volume proportions of the various services to the controller based on an actual service requirement. Alternatively, after the network is put into use, the controller may obtain service volume proportions of various services in a current network by using a communication device.

For example, services are classified into a type A service, a type B service, and a type C service, and service volume proportions of the three types of services are respectively $P_A$, $P_B$, and $P_C$.

S12: Initialize a base frame length.

The base frame length indicates a maximum length of a packet forwarded by a queue at a time.

In an embodiment, the base frame length is initialized to a preset packet length.

S13: For each service priority, determine an upper latency limit and an upper jitter limit of a packet of the service priority in the communication device.

In an embodiment, for each service priority, the controller determines upper latency limits of the packet of the service priority in communication devices based on the quantity of nodes on the longest path in the network and an upper latency limit corresponding to the service priority, and determines upper jitter limits of the packet of the service priority in the communication devices based on the quantity of nodes on the longest path in the network and an upper jitter limit corresponding to the service priority.

For example, the service priorities include a type A service priority, a type B service priority and a type C service priority. When a pass-through flow packet and an access flow packet have a same priority, upper latency limits of a packet in an edge device and a packet in a forwarding device are the same, and upper jitter limits of the packet in the edge device and the packet in the forwarding device are also the same.

For the type A service priority, an upper latency limit of a packet of the type A service priority in the communication device needs to meet the following conditions:

$$(H_{max}-1)*D_{A\text{-}P/PE} \leq D_A \qquad (1)$$

$D_{A-P/PE}$ is the upper latency limit of the packet of the type A service priority in the communication device, and $D_A$ is an upper latency limit corresponding to the type A service priority.

The inequality (1) is solved, and a value is randomly selected from values of $D_{A-P/PE}$ that make the inequality (1) true as the upper latency limit of the packet of the type A service priority in the communication device.

$$(H_{max}-1)*J_{A-P/PE} < J_A \qquad (2)$$

$J_{A-P/PE}$ is an upper jitter limit of the packet of the type A service priority in the communication device, and $J_A$ is an upper jitter limit corresponding to the type A service priority.

The inequality (2) is solved, and a value is randomly selected from values of $J_{A-P/PE}$ that make the inequality (2) true as the upper jitter limit of the packet of the type A service priority in the communication device.

Similarly, for the type B service priority, an upper latency limit $D_{B-P/PE}$ corresponding to a packet of the type B service priority in the communication device and an upper jitter limit $J_{B-P/PE}$ corresponding to the packet of the type B service priority in the communication device may be determined.

For the type C service priority, an upper latency limit $D_{C-P/PE}$ corresponding to a packet of the type C service priority in the communication device and an upper jitter limit $J_{C-P/PE}$ corresponding to the packet of the type C service priority in the communication device may be determined.

S14: For each communication device, determine a multiframe length of the communication device.

The multiframe length indicates a maximum length of a packet forwarded by all queues in a forwarding periodicity.

In an embodiment, for each communication device, the controller may determine a multiframe length of the communication device based on upper latency limits corresponding to packets of various service priorities in the communication device, upper jitter limits corresponding to the packets of the various service priorities in the communication device, a bandwidth of an egress port of the communication device, periodic burst data volumes corresponding to the various service priorities, service volume proportions corresponding to the various service priorities, and the base frame length.

For example, the service priorities include the type A service priority, the type B service priority and the type C service priority. The multiframe length needs to meet the following latency conditions and jitter conditions.

The latency conditions are as follows:

$$L_n \le D_{A-P/PE} * R_n / \left\lceil \frac{B_A}{M} \right\rceil \qquad (3)$$

$$L_n \le D_{B-P/PE} * R_n / \left\lceil \frac{B_B}{M} \right\rceil \qquad (4)$$

$$L_n \le D_{C-P/PE} * R_n / \left\lceil \frac{B_C}{M} \right\rceil \qquad (5)$$

The jitter conditions are as follows:

$$L_n \le (J_{A-P/PE} * R_n / M + 1) / P_A \qquad (6)$$

$$L_n \le (J_{B-P/PE} * R_n / M + 1) / P_B \qquad (7)$$

$$L_n \le (J_{C-P/PE} * R_n / M + 1) / P_C \qquad (8)$$

$L_n$ is the multiframe length, $R_n$ is the bandwidth of the egress port of the communication device, $B_A$ is a periodic burst data volume corresponding to the type A service priority, $B_B$ is a periodic burst data volume of the type B service priority, $B_C$ is a periodic burst data volume corresponding to the type C service priority, and M is the base frame length.

The inequalities (3), (4), (5), (6), (7), and (8) are solved to obtain $L_n$ that makes all the six inequalities true. In addition, for a communication device, a value of $L_n$ that makes all the six inequalities true is not unique. Therefore, a maximum value may be selected from values of $L_n$ that make all the six inequalities true as a multiframe length of the communication device.

In addition, it should be noted that, for communication devices having a same forwarding capability parameter, a multiframe length corresponding only to one of the communication devices may be determined.

Figure 4:
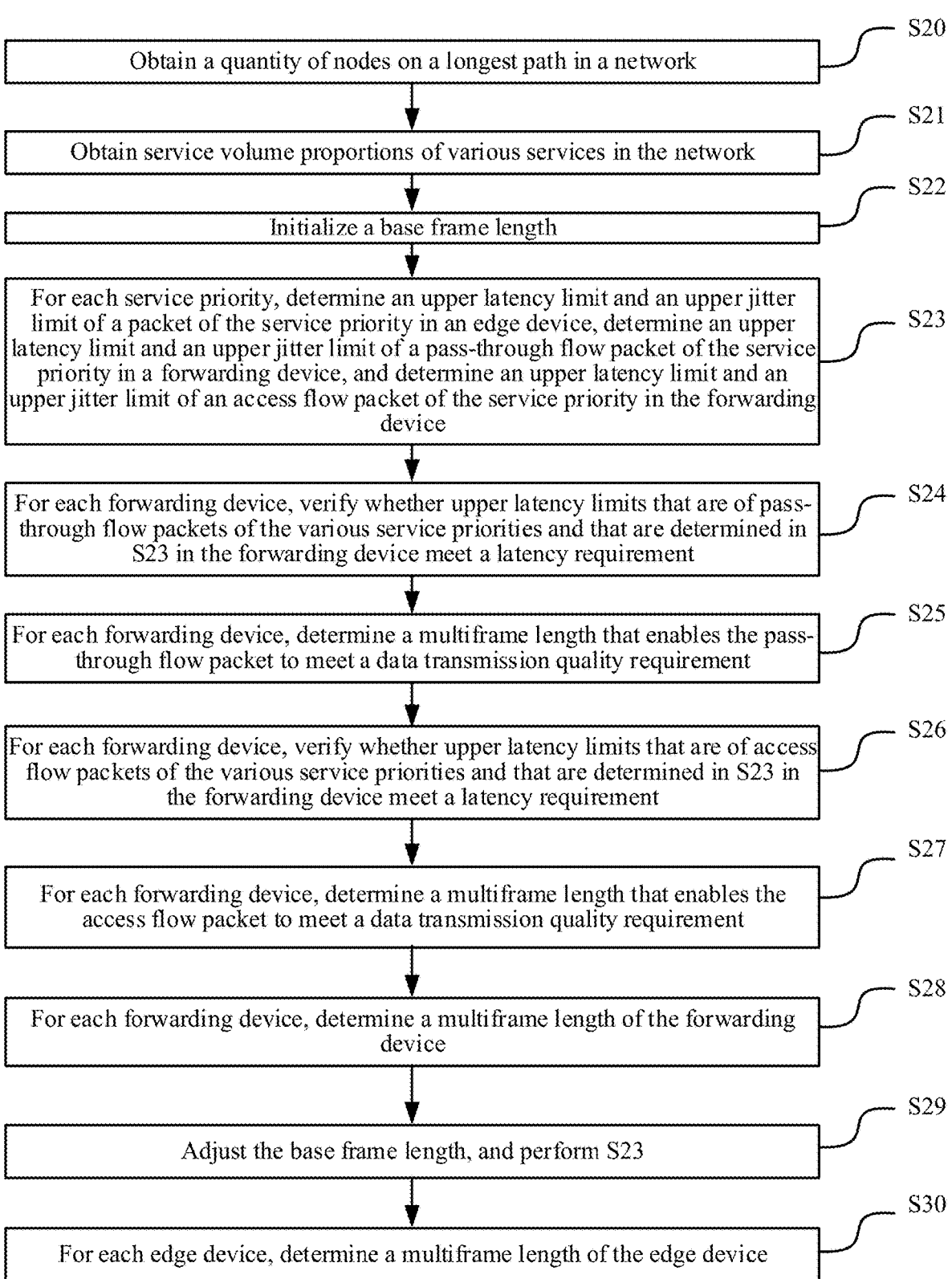
FIG. 4 is still another flowchart of a parameter configuration method according to an embodiment of this application.

2. When a priority of a pass-through flow packet is higher than a priority of an access flow packet, a method for determining a configuration parameter of an edge device may be different from a method for determining a configuration parameter of a forwarding device. In an embodiment, refer to FIG. 4. A method for determining a configuration parameter may be as follows:

S20: Obtain a quantity of nodes on a longest path in a network.

S21: Obtain service volume proportions of various services in the network.

S22: Initialize a base frame length.

It should be noted that processing of S20, S21, and S22 is respectively the same as processing of S10, S11, and S12. Details are not described herein again.

S23: For each service priority, determine an upper latency limit and an upper jitter limit of a packet of the service priority in an edge device, determine an upper latency limit and an upper jitter limit of a pass-through flow packet of the service priority in a forwarding device, and determine an upper latency limit and an upper jitter limit of an access flow packet of the service priority in the forwarding device.

In an embodiment, for each service priority, a controller determines upper latency limits of a packet of the service priority in communication devices based on the quantity of nodes on the longest path in the network and an upper latency limit corresponding to the service priority, and determines upper jitter limits of the packet of the service priority in the communication devices based on the quantity of nodes on the longest path in the network and an upper jitter limit corresponding to the service priority.

For example, the service priorities include a type A service priority, a type B service priority and a type C service priority.

For the type A service priority, an upper latency limit of a packet of the type A service priority in the edge device, an upper latency limit of an access flow packet of the type A service priority in the forwarding device, and an upper latency limit of a pass-through flow packet of the type A service priority in the forwarding device need to meet the following conditions:

$$D_{A-PE} + D_{A-P-AC} + (H_{max}-3) * D_{A-P-CT} \le D_A \qquad (9)$$

$D_{A-PE}$ is the upper latency limit of the packet of the type A service priority in the edge device, $D_{A-P-AC}$ is the upper latency limit of the access flow packet of the type A service priority in the forwarding device, $D_{A-P-CT}$ is the upper latency limit of the pass-through flow packet of the type A service priority in the forwarding device, and $D_A$ is an upper latency limit corresponding to the type A service priority.

Methods for solving the inequality (9) may be different in different cases.

Case 1: S23 is performed for the first time.

In this case, the inequality (9) is solved, and a group of values are randomly selected from values of $D_{A-PE}$, $D_{A-P-AC}$, and $D_{A-P-CT}$ that make the inequality (9) true as the upper latency limit of the packet of the type A service priority in the edge device, the upper latency limit of the access flow packet of the type A service priority in the forwarding device, and the upper latency limit of the pass-through flow packet of the type A service priority in the forwarding device.

Case 2: S23 is not performed for the first time, and $D_{A-P-CT}$ is adjusted in S24, and/or $D_{A-P-AC}$ is adjusted in S26 (for details about the adjustment, refer to related descriptions in S24 and S26).

In this case, an adjusted value of $D_{A-P-CT}$ and/or an adjusted value of $D_{A-P-AC}$ are/is substituted into the inequality (9). Then, the inequality (9) is solved, and values of unknown numbers that make the inequality (9) true are randomly selected. The unknown numbers refer to a parameter in $D_{A-P-CT}$ and $D_{A-P-AC}$ that is not adjusted, and $D_{A-PE}$.

Case 3: S23 is not performed for the first time, and neither $D_{A-P-CT}$ nor $D_{A-P-AC}$ is adjusted.

In this case, values of $D_{A-PE}$, $D_{A-P-CT}$, and $D_{A-P-AC}$ that are determined when S23 is performed last time are directly obtained.

$$J_{A-PE} + J_{A-P-AC} + (H_{max}-3)*J_{A-P-CT} \leq J_A \qquad (10)$$

$J_{A-PE}$ is an upper jitter limit of the packet of the type A service priority in the edge device, $J_{A-P-AC}$ is an upper jitter limit of the access flow packet of the type A service priority in the forwarding device, $J_{A-P-CT}$ is an upper jitter limit of the pass-through flow packet of the type A service priority in the forwarding device, and $J_A$ is an upper jitter limit corresponding to the type A service priority. Methods for solving the inequality (10) may be different in different cases.

Case 1: S23 is performed for the first time.

In this case, the inequality (10) is solved, and a group of values are randomly selected from values of $J_{A-PE}$, $J_{A-P-AC}$, and $J_{A-P-CT}$ that make the inequality (10) true as the upper jitter limit of the packet of the type A service priority in the edge device, the upper jitter limit of the access flow packet of the type A service priority in the forwarding device, and the upper jitter limit of the pass-through flow packet of the type A service priority in the forwarding device.

Case 2: S23 is not performed for the first time, and $J_{A-P-CT}$ is adjusted in S24, and/or $J_{A-P-AC}$ is adjusted in S26 (for details about the adjustment, refer to related descriptions in S24 and S26).

In this case, an adjusted value of $J_{A-P-CT}$ and/or an adjusted value of $J_{A-P-AC}$ are/is substituted into the inequality (10). Then, the inequality (10) is solved, and values of unknown numbers that make the inequality (10) true are randomly selected. The unknown numbers refer to a parameter in $J_{A-P-CT}$ and $J_{A-P-AC}$ that is not adjusted, and $J_{A-PE}$.

Case 3: S23 is not performed for the first time, and neither $J_{A-P-CT}$ nor $J_{A-P-AC}$ is adjusted.

In this case, values of $J_{A-PE}$, $J_{A-P-CT}$, and $J_{A-P-AC}$ that are determined when S23 is performed last time are directly obtained.

Similarly, for the type B service priority, an upper latency limit $D_{B-PE}$ of a packet of the type B service priority in the edge device, an upper latency limit $D_{B-P-AC}$ of an access flow packet of the type B service priority in the forwarding device, and an upper latency limit $D_{B-P-CT}$ of a pass-through flow packet of the type B service priority in the forwarding device may be determined. In addition, an upper jitter limit $J_{B-PE}$ of the packet of the type B service priority in the edge device, an upper jitter limit $J_{B-P-AC}$ of the access flow packet of the type B service priority in the forwarding device, and an upper jitter limit $J_{B-P-CT}$ of the pass-through flow packet of the type B service priority in the forwarding device are determined.

For the type C service priority, an upper latency limit $D_{C-PE}$ of a packet of the type C service priority in the edge device, an upper latency limit $D_{C-P-AC}$ of an access flow packet of the type C service priority in the forwarding device, and an upper latency limit $D_{C-P-CT}$ of a pass-through flow packet of the type C service priority in the forwarding device may be determined. In addition, an upper jitter limit $J_{C-PE}$ of the packet of the type C service priority in the edge device, an upper jitter limit $J_{C-P-AC}$ of the access flow packet of the type C service priority in the forwarding device, and an upper jitter limit $J_{C-P-CT}$ of the pass-through flow packet of the type C service priority in the forwarding device are determined.

S24: For each forwarding device, verify whether upper latency limits that are of pass-through flow packets of the various service priorities and that are determined in S23 in the forwarding device meet a latency requirement.

In an embodiment, the verification method may be as follows:

For example, the service priorities include the type A service priority, the type B service priority and the type C service priority. The upper latency limits of the pass-through flow packets of the various service priorities in the forwarding device need to meet the following conditions:

$$D_{A-P-CT} \geq (N_{CT}-1)*\frac{M}{S_n*R_n} + \frac{M}{S_n*R_n} = N_{CT}*\frac{M}{S_n*R_n} \qquad (11)$$

$$D_{B-P-CT} \geq (N_{CT}-1)*\frac{M}{S_n*R_n} + \frac{M}{S_n*R_n} = N_{CT}*\frac{M}{S_n*R_n} \qquad (12)$$

$$D_{C-P-CT} \geq (N_{CT}-1)*\frac{M}{S_n*R_n} + \frac{M}{S_n*R_n} = N_{CT}*\frac{M}{S_n*R_n} \qquad (13)$$

$D_{A-P-CT}$ is the upper latency limit of the pass-through flow packet of the type A service priority in the forwarding device, $D_{B-P-CT}$ is the upper latency limit of the pass-through flow packet of the type B service priority in the forwarding device, and $D_{C-P-CT}$ is the upper latency limit of the pass-through flow packet of the type C service priority in the forwarding device. $S_n$ is a maximum available bandwidth proportion of a pass-through flow packet. $N_{CT}$ is a quantity of pass-through flow packets. A value of $N_{CT}$ may be obtained by the controller from network topology information.

If all the foregoing three inequalities are true, it is determined that, for the forwarding device, the upper latency limits of the pass-through flow packets of the various service priorities in the forwarding device meet the latency requirement.

When upper latency limits of the pass-through flow packets of the various service priorities in all forwarding devices meet the latency requirement, S25 continues to be performed.

If an inequality in the foregoing three inequalities is not true, for the inequality that is not true, an upper latency limit in the inequality is adjusted. An adjustment method may be: increasing a value of the upper latency limit based on a preset rule. In an embodiment, the preset rule may be adding a random value to the upper latency limit, adding a preset value to the upper latency limit, or adding a value to the upper latency limit proportionally.

After the adjustment of the upper latency limit is completed, S23 is performed. If a plurality of inequalities are not true, all upper latency limits in the plurality of inequalities need to be adjusted, and then S23 is performed.

If a total quantity of times of adjusting the inequalities in the foregoing three inequalities reaches a preset quantity of times, S29 is performed.

S25: For each forwarding device, determine a multiframe length that enables the pass-through flow packet to meet a data transmission quality requirement.

In an embodiment, for each forwarding device, the controller may determine, based on upper jitter limits of the pass-through flow packets of the various service priorities in the forwarding device, a bandwidth of an egress port of the communication device, a bandwidth proportion corresponding to the pass-through flow packet, service volume proportions corresponding to the various service priorities, and the base frame length, the multiframe length that enables the pass-through flow packet to meet the data transmission quality requirement.

For example, the service priorities include the type A service priority, the type B service priority and the type C service priority. The multiframe length needs to meet the following conditions:

$$L_{n1} \leq (J_{A\text{-}P\text{-}CT} * S_n * R_n / M + 1)/P_A \quad (14)$$

$$L_{n1} \leq (J_{B\text{-}P\text{-}CT} * S_n * R_n / M + 1)/P_B \quad (15)$$

$$L_{n1} \leq (J_{C\text{-}P\text{-}CT} * S_n * R_n / M + 1)/P_C \quad (16)$$

$L_{n1}$ is the multiframe length, $P_A$ is a service volume proportion corresponding to the type A service priority, $P_B$ is a service volume proportion corresponding to the type B service priority, and $P_C$ is a service volume proportion corresponding to the type C service priority.

The inequalities (14), (15), and (16) are solved to obtain $L_{n1}$ that makes all the three inequalities true. In addition, a value of $L_{n1}$ that makes all the foregoing three inequalities true is not unique. Therefore, a maximum value may be selected from values of $L_{n1}$ that make all the foregoing three inequalities true as the multiframe length that enables the pass-through flow packet to meet the data transmission quality requirement.

S26: For each forwarding device, verify whether upper latency limits that are of access flow packets of the various service priorities and that are determined in S23 in the forwarding device meet the latency requirement.

In an embodiment, the verification method may be as follows:

For example, the service priorities include the type A service priority, the type B service priority and the type C service priority. The upper latency limits of the access flow packets of the various service priorities in the forwarding device need to meet the following conditions:

$$D_{A\text{-}P\text{-}AC} \geq (N_{AC} - 1) * \frac{M}{(1-S_n)*R_n} + \frac{M}{(1-S_n)*R_n} = \quad (17)$$

$$N_{AC} * \frac{M}{(1-S_n)*R_n}$$

$$D_{B\text{-}P\text{-}AC} \geq (N_{AC} - 1) * \frac{M}{(1-S_n)*R_n} + \frac{M}{(1-S_n)*R_n} = \quad (18)$$

$$N_{AC} * \frac{M}{(1-S_n)*R_n}$$

-continued $$D_{C\text{-}P\text{-}AC} \geq (N_{AC} - 1) * \frac{M}{(1-S_n)*R_n} + \frac{M}{(1-S_n)*R_n} = \quad (19)$$

$$N_{AC} * \frac{M}{(1-S_n)*R_n}$$

$D_{A\text{-}P\text{-}AC}$ is the upper latency limit of the access flow packet of the type A service priority in the forwarding device, $D_{B\text{-}P\text{-}AC}$ is the upper latency limit of the access flow packet of the type B service priority in the forwarding device, and $D_{C\text{-}P\text{-}AC}$ is the upper latency limit of the access flow packet of the type C service priority in the forwarding device. $(1-S_n)$ is a maximum available bandwidth proportion of the access flow packet. $N_{AC}$ is a quantity of access flow packets. A value of NAC may be obtained by the controller from the network topology information.

If the inequalities (17), (18), and (19) are all true, it is determined that, for the forwarding device, the upper latency limits of the access flow packets of the various service priorities in the forwarding device meet the latency requirement.

When upper latency limits of the access flow packets of the various service priorities in all forwarding devices meet the latency requirement, S27 continues to be performed.

If an inequality in the inequalities (17), (18), and (19) is not true, $S_n$ is adjusted, and S24 is performed. In an embodiment, an adjustment method may be: decreasing S n based on a preset rule. The preset rule may be decreasing original $S_n$ by a preset value, or decreasing S n by a value proportionally.

If $S_n$ is adjusted to a preset minimum value, and the inequalities (17), (18), and (19) still cannot be all true, for an inequality that is not true, an upper latency limit in the inequality is adjusted. An adjustment method may be: increasing a value of the upper latency limit based on a preset rule. The preset rule may be adding a random value to the upper latency limit, adding a preset value to the upper latency limit, or adding a value to the upper latency limit proportionally.

After the adjustment of the upper latency limit is completed, S23 is performed. If a plurality of inequalities are not true, all upper latency limits in the plurality of inequalities need to be adjusted, and then S23 is performed.

If a total quantity of times of adjusting the upper latency limit in the inequalities (17), (18), and (19) reaches a preset quantity of times, S29 is performed.

S27: For each forwarding device, determine a multiframe length that enables the access flow packet to meet the data transmission quality requirement.

In an embodiment, for each forwarding device, the controller may determine, based on upper jitter limits of the access flow packets of the various service priorities in the forwarding device, the bandwidth of the egress port of the communication device, a bandwidth proportion corresponding to the access flow packet, the service volume proportions corresponding to the various service priorities, and the base frame length, the multiframe length that enables the access flow packet to meet the data transmission quality requirement.

For example, the service priorities include the type A service priority, the type B service priority and the type C service priority. The multiframe length needs to meet the following conditions:

$$L_{n2} \leq (J_{A\text{-}P\text{-}AC} * (1-S_n) * R_n / M + 1)/P_A \quad (20)$$

$$L_{n2} \leq (J_{B\text{-}P\text{-}AC} * (1-S_n) * R_n / M + 1)/P_B \quad (21)$$

$$L_{n2} \leq (J_{C\text{-}P\text{-}AC} * (1-S_n) * R_n / M + 1)/P_C \quad (22)$$

$L_{n2}$ is the multiframe length, $P_A$ is the service volume proportion corresponding to the type A service priority, $P_B$ is the service volume proportion corresponding to the type B service priority, and $P_C$ is the service volume proportion corresponding to the type C service priority.

The inequalities (14), (15), and (16) are solved to obtain $L_{n2}$ that makes all the three inequalities true. In addition, a value of $L_{n2}$ that makes all the foregoing three inequalities true is not unique. Therefore, a maximum value may be selected from values of $L_{n2}$ that make all the foregoing three inequalities true as the multiframe length that enables the access flow packet to meet the data transmission quality requirement.

S28: For each forwarding device, determine a multiframe length of the forwarding device.

In an embodiment, for each forwarding device, a smaller value is selected as the multiframe length of the forwarding device from the multiframe length that enables the access flow packet to meet the data transmission quality requirement and the multiframe length that enables the pass-through flow packet to meet the data transmission quality requirement.

In addition, when S28 is performed, S30 is synchronously performed. Alternatively, after S28 is performed, S30 is performed.

S29: Adjust the base frame length, and perform S23.

In an embodiment, the controller increases a current base frame length by a preset packet length, and S23 is performed.

S30: For each edge device, determine a multiframe length of the edge device.

In an embodiment, for each edge device, the controller may determine the multiframe length of the edge device based on upper latency limits corresponding to packets of the various service priorities in the edge device, upper jitter limits corresponding to the packets of the various service priorities in the edge device, a bandwidth of an egress port of the edge device, periodic burst data volumes corresponding to the various service priorities, the service volume proportions corresponding to the various service priorities, and the base frame length.

For example, the service priorities include the type A service priority, the type B service priority and the type C service priority. The multiframe length needs to meet the following latency conditions and jitter conditions.

The latency conditions are as follows:

$$L_n \leq D_{A-PE} * R_n / \left\lceil \frac{B_A}{M} \right\rceil \qquad (23)$$

$$L_n \leq D_{B-PE} * R_n / \left\lceil \frac{B_B}{M} \right\rceil \qquad (24)$$

$$L_n \leq D_{C-PE} * R_n / \left\lceil \frac{B_C}{M} \right\rceil \qquad (25)$$

The jitter conditions are as follows:

$$L_n \leq (J_{A-PE} * R_n/M + 1)/P_A \qquad (26)$$

$$L_n \leq (J_{B-PE} * R_n/M + 1)/P_B \qquad (27)$$

$$L_n \leq (J_{C-PE} * R_n/M + 1)/P_C \qquad (28)$$

$L_n$ is the multiframe length, $R_n$ is the bandwidth of the egress port of the communication device, $B_A$ is a periodic burst data volume corresponding to the type A service priority, $B_B$ is a periodic burst data volume of the type B service priority, $B_C$ is a periodic burst data volume corresponding to the type C service priority, and M is the base frame length.

The inequalities (23), (24), (25), (26), (27), and (28) are solved to obtain $L_n$ that makes all the six inequalities true. In addition, for an edge device, a value of $L_n$ that makes all the six inequalities true is not unique. Therefore, a maximum value may be selected from values of $L_n$ that make all the six inequalities true as a multiframe length of the edge device.

In addition, it should be noted that, for edge devices having a same forwarding capability parameter, a multiframe length corresponding only to one of the edge devices may be determined.

Operation 204: The controller sends the configuration parameter to the communication device.

In an embodiment, for each communication device, the controller may deliver the determined base frame length and the determined multiframe length as queue configuration parameters to the communication device. In addition, the controller may further deliver parameters such as the service volume proportions of the various priorities, a correspondence between the service and the service priority, and the preset packet length to the communication device.

In an embodiment, the controller may not directly deliver the base frame length and the multiframe length, but convert the base frame length and the multiframe length into the queue configuration parameters used to guide forwarding, and deliver the queue configuration parameters used to guide forwarding to the communication device. In an embodiment, the forwarding capability parameter of the communication device obtained by the controller may further include a queue type and a quantity of queues on the egress port. For example, the queue type is a time-aware shaping (TAS) queue, and correspondingly, the queue configuration parameter may include a forwarding periodicity length, a time slice length, and time slice quantities corresponding to the various service priorities. The time slice length is unit scheduling duration in which a queue schedules a packet.

An example in which a queue of the communication device is a TAS queue is used below to describe conversion of the base frame length and the multiframe length into the queue configuration parameters used to guide forwarding.

A method for calculating a forwarding periodicity length T may be as follows:

$$T = \frac{L_n}{R_n} \qquad (29)$$

A method for calculating a time slice length t may be as follows:

$$t = \frac{M}{R_n} \qquad (30)$$

A method for calculating the time slice quantities corresponding to the various service priorities is as follows:

For example, the service priorities include the type A service priority, the type B service priority and the type C service priority.

A time slice quantity corresponding to the type A service priority is as follows:

$$C_A = \frac{L_n}{R_n} P_A \qquad (31)$$

A time slice quantity corresponding to the type B service priority is as follows:

$$C_B = \frac{L_n}{R_n} P_B \tag{32}$$

A time slice quantity corresponding to the type C service priority is as follows:

$$C_C = \frac{L_n}{R_n} P_C \tag{33}$$

An example in which a queue of the communication device is a weighted round robin (WRR) queue is used below to describe conversion of the base frame length and the like into the queue configuration parameters used to guide forwarding.

Scheduling granularity: The base frame length obtained in the foregoing operations is used as the scheduling granularity.

Weight coefficient of a queue and queue quantities corresponding to the various service priorities: For example, the service priorities are classified into the type A service priority, the type B service priority, and the type C service priority. The weight coefficient of the queue needs to meet the following conditions:

$$\sum_{i=1}^{x} a_i : \sum_{l=1}^{y} b_l : \sum_{k=1}^{z} c_k = P_A : P_B : P_C \tag{34}$$

$a_i$ is a queue weight of an $i^{th}$ queue corresponding to the type A service priority, x is a quantity of queues that corresponds to the type A service priority, $b_l$ is a queue weight of an $l^{th}$ queue corresponding to the type B service priority, y is a quantity of queues that corresponds to the type B service priority, $c_k$ is a queue weight of a $k^{th}$ queue corresponding to the type C service priority, and z is a quantity of queues that corresponds to the type C service priority.

Weight coefficients of queues and the queue quantities corresponding to the various service priorities may be obtained by solving the formula (34).

For example, there are eight queues on the egress port of the communication device, and queue weights of the queues are respectively 1, 1, 1, 1, 2, 2, 2, and 2. A proportion relationship of the service volume proportions of the various service priorities is as follows: $P_A : P_B : P_C = 1:3:8$. In this case, queue allocation needs to meet the following condition:

$$\sum_{i=1}^{x} a_i : \sum_{l=1}^{y} b_l : \sum_{k=1}^{z} c_k = P_A : P_B : P_C = 1 : 3 : 8$$

The queue weights obtained through solving are respectively 1, 1, 1, 1, 2, 2, 2, and 2, and values of x, y, and z may be as follows: x=1, y=3, and z=4.

In addition, the queue configuration parameter used to guide forwarding may further include a queue shaping parameter. The queue shaping parameter may include parameters such as a committed information rate (CIR) and a committed burst size (CBS). The CBS may be set to the calculated base frame length.

For setting of the CIR, an example in which the queue type is set to a WRR queue is used for description.

For example, the bandwidth of the egress port of the communication device is 1 Gbps, there are eight queues on the egress port, and queue weights of the queues are respectively 1, 1, 1, 1, 2, 2, 2, and 2. In this case, CIRs corresponding to queues whose queue weights are 1 in the eight queues are as follows:

$$\frac{1}{1+1+1+1+2+2+2+2} \times 1\,\text{Gbps} = \frac{1}{12}\,\text{Gbps}$$

CIRs corresponding to queues whose queue weights are 2 in the eight queues are as follows:

$$\frac{2}{1+1+1+1+2+2+2+2} \times 1\,\text{Gbps} = \frac{1}{6}\,\text{Gbps}$$

Operation 205: The communication device performs configuration based on the configuration parameter.

In an embodiment, when the queue configuration parameters delivered by the controller are the base frame length and the multiframe length, the communication device may first determine to obtain, based on the conversion method in operation 204, the queue configuration parameter used to guide forwarding.

Then, the communication device determines, based on the queue configuration parameter, queues corresponding to the various service priorities.

For example, there are eight queues on the egress port of the communication device, and the eight queues are sorted based on scheduling priorities of the queues as follows: a queue 1, a queue 2, a queue 3, a queue 4, a queue 5, a queue 6, a queue 7, and a queue 8. In a forwarding periodicity, a queue having a higher scheduling priority is scheduled earlier. During queue allocation, the type A service priority is allocated to one queue, namely, the queue 1. The type B service priority is allocated to three queues, namely, the queue 2, the queue 3, and the queue 4. The type C service priority is allocated to four queues, namely, the queue 5, the queue 6, the queue 7, and the queue 8.

According to the configuration method provided in an embodiment of the application, the communication device may be configured based on an actual service requirement of the user, so that the communication device can better ensure the data transmission quality requirement of the service.

Figure 5:
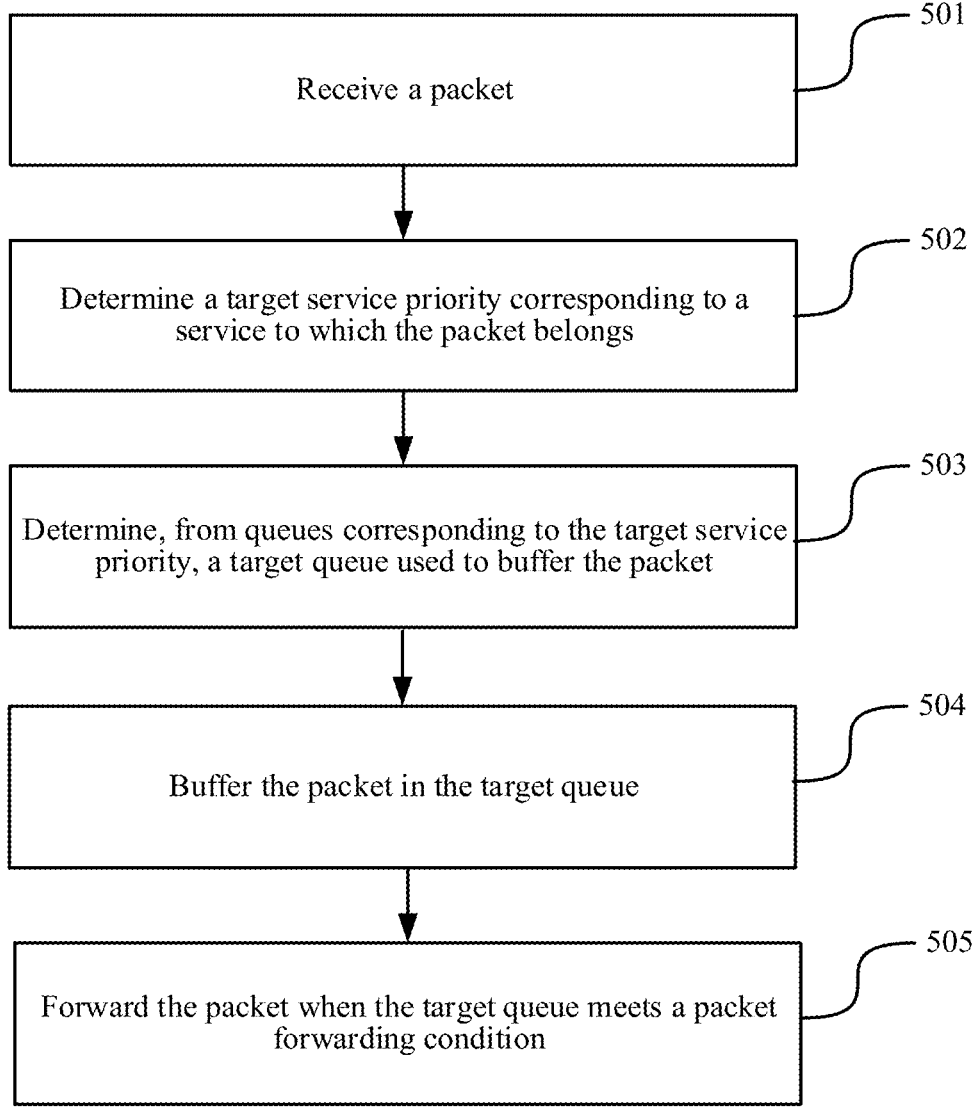
FIG. 5 is a flowchart of a packet forwarding method according to an embodiment of this application.

After the configuration is completed, the communication device may forward the packet based on the configuration. As shown in FIG. 5, packet forwarding processing performed by a communication device may include the following operations:

Operation 501: Receive a packet.

In an embodiment, when the communication device is an edge device, the communication device receives a packet sent by a user side device. When the communication device is a forwarding device, the communication device receives a packet sent by a previous-hop communication device.

In an embodiment, when the communication device is an edge device, after receiving the packet, the communication device may first perform fixed-length processing on the packet, and process the packet to have a preset packet length, so that forwarding duration of each packet is the same in a same bandwidth. In an embodiment, the fixed-length processing may include one or more of packet slicing, packet shaping, and the like. A manner of the fixed-length processing is not limited in an embodiment of the application. In addition, it should be noted that, in a time-aware network, a packet transmitting end and a packet receiving end may negotiate a length of a packet to be sent, so that a length of a packet actually sent by the transmitting end does not exceed a preset packet length. In this way, the packet does not need to be sliced in the communication device. In a conventional network, when receiving a packet whose length is greater than the preset packet length, the communication device may slice the packet with reference to a maximum transmission unit (MTU) solution of an IP packet, so that a slicing length does not exceed the preset packet length. For a plurality of slices obtained by slicing a packet, sequence numbers may be added based on locations of the slices in the original packet. After receiving the slices, the receiving end reassembles the slices based on the sequence numbers in the slices to obtain the original packet.

Operation 502: Determine a target service priority corresponding to a service to which the packet belongs.

In an embodiment, the communication device obtains a service identifier carried in the packet. The service identifier indicates a service type of the packet.

Then, in a stored correspondence between a service and a service priority, the communication device determines the target service priority corresponding to the service identifier carried in the packet.

Operation 503: Determine, from queues corresponding to the target service priority, a target queue used to buffer the packet.

The queue may be a WRR queue, a TAS queue, or the like.

In an embodiment, manners of selecting queues for the packets of different service priorities may also be different. The following describes the manners of selecting queues for the packets of different service priorities by using an example in which service priorities include a type A service priority, a type B service priority, and a type C service priority.

When the target service priority corresponding to the packet is a type A service priority, because a queue having a highest priority is allocated to the type A service priority, after it is determined that the packet corresponds to the type A service priority, the packet is buffered in the queue.

When the target service priority corresponding to the packet is the type B service priority, a quantity of packets currently buffered in the queues corresponding to the type B service priority is first determined, and a queue having a smaller quantity of packets is selected from these queues as the target queue for buffering the packet. If there are a plurality of queues having a smaller quantity of packets, a queue having a highest scheduling priority is selected from the plurality of queues having a smaller quantity of packets as the target queue used to buffer the packets.

A method for determining the quantity of packets currently buffered in the queue may be: reading a value currently recorded by a packet counter of the queue, and using the value as the quantity of packets currently buffered in the queue.

In addition, it should be noted that, if a plurality of queues are allocated to the type A service priority, a manner of selecting a queue for a packet of the type A service priority may be the same as a manner of selecting a queue for a packet of the type B service priority.

When the target service priority corresponding to the packet is a type C service priority, any queue may be selected from queues corresponding to the type C service priority as a queue used to buffer a first packet. Alternatively, a manner of selecting a queue for a packet of the type C service priority may be the same as a manner of selecting a queue for the packet of the type B service priority.

In an embodiment, when the communication device is a forwarding device, and a plurality of packets need to be buffered in a queue at a same time, the forwarding device may first determine whether the packet is a pass-through flow packet or an access flow packet. Then, the forwarding device preferentially processes the pass-through flow packets, determines, after buffering all the pass-through flow packets in corresponding queues, queues used to buffer the access flow packets, and buffers the access flow packets in the determined queues.

Operation 504: Buffer the packet in the target queue.

In an embodiment, after the target queue used to buffer the packet is determined, the packet is buffered in the target queue.

Operation 505: Forward the packet when the target queue meets a packet forwarding condition.

In an embodiment, forwarding processing for different types of queues is also different. The following uses the WRR queue as an example.

For example, there are eight queues in total, and the eight queues are sorted based on queue scheduling priorities as follows: a queue 1, a queue 2, a queue 3, a queue 4, a queue 5, a queue 6, a queue 7, and a queue 8. Queue weights of the queues are respectively 1, 1, 1, 1, 2, 2, 2, and 2, and a scheduling granularity is the preset packet length. In a forwarding periodicity, a read pointer is first set to point to the queue 1, and a packet that first enters the queue 1 is read and forwarded. Then, the read pointer is set to point to the queue 2, and a packet that first enters the queue 2 is read and forwarded. Then, the read pointer is set to point to the queue 3, and a packet that first enters the queue 3 is read and forwarded. Then, the read pointer is set to point to the queue 4, and a packet that first enters the queue 4 is read and forwarded. Then, the read pointer is set to point to the queue 5, and two packets that first enter the queue 5 are read and forwarded. Then, the read pointer is set to point to the queue 6, and two packets that first enter the queue 6 are read and forwarded. Then, the read pointer is set to point to the queue 7, and two packets that first enter the queue 7 are read and forwarded. Finally, the read pointer is set to point to the queue 8, and two packets that first enter the queue 8 are read and forwarded. Next, a next forwarding periodicity starts, and packets continue to be forwarded from the queue 1 to the queue 8.

In addition, it should be noted that, if a quantity of packets in a queue is X, a maximum quantity of packets that can be forwarded by the queue is Y, and X<Y, after the X packets in the queue are forwarded and after forwarding duration of (Y−X) packets, a packet in a next queue continues to be forwarded.

In an embodiment, the communication device may further report, based on a preset periodicity or after receiving an actual service volume query request sent by the controller, actual service volume proportions of the various service priorities to the controller. Correspondingly, after receiving the actual service volume proportions of the various service priorities reported by the communication device, if the controller determines that the actual service volume proportions of the various service priorities are different from original service volume proportions, the controller may perform the method performed by the controller in FIG. 2 to re-determine configuration parameters of the communication devices.

The following describes a base frame and a multiframe in this application with reference to an example of a forwarding process.

Figures 6, 7:
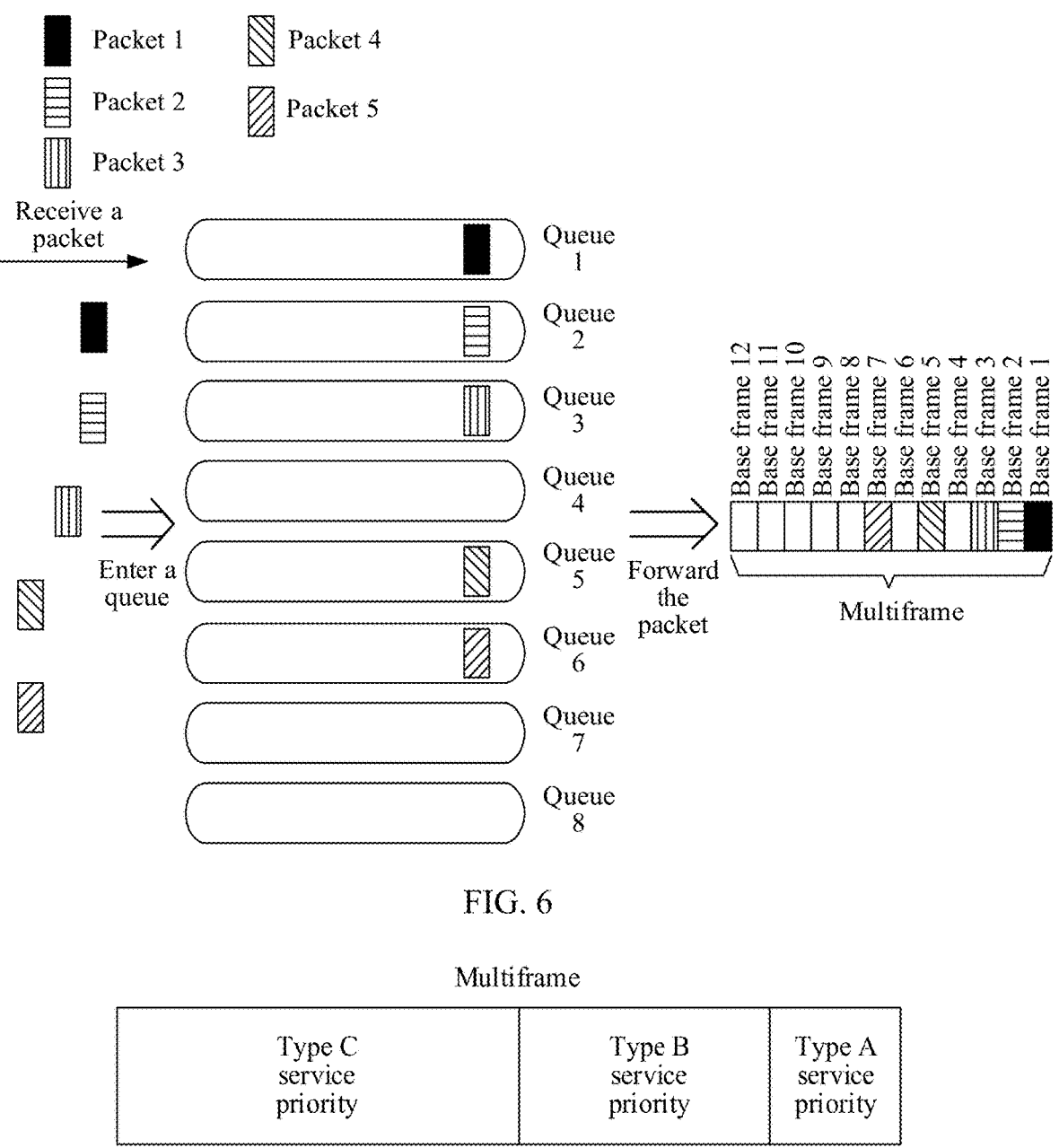
FIG. 6 is a schematic diagram of a multiframe according to an embodiment of this application.
FIG. 7 is another schematic diagram of a multiframe according to an embodiment of this application.

Refer to FIG. 6. There are eight queues in total, and the eight queues are sorted based on scheduling priorities of the queues as follows: a queue 1, a queue 2, a queue 3, a queue 4, a queue 5, a queue 6, a queue 7, and a queue 8. Queue weights of the queues are respectively 1, 1, 1, 1, 2, 2, 2, and 2, and a scheduling granularity is a preset packet length. The queue 1 is used to buffer a packet of a type A service priority, the queues 2, 3, and 4 are used to buffer a packet of a type B service priority, and the queues 5, 6, 7, and 8 are used to buffer a packet of a type C service priority.

The communication device first receives the packet 1, determines that the packet 1 corresponds to the type A service priority, and buffers the packet 1 in the queue 1. The communication device further receives the packet 2, determines that the packet 2 corresponds to the type B service priority, and buffers the packet 2 in the queue 2 based on the method for selecting a queue for the packet of the type B service priority in the foregoing embodiment. The communication device further receives the packet 3, determines that the packet 3 corresponds to the type B service priority, and buffers the packet 3 in the queue 3 based on the method for selecting a queue for the packet of the type B service priority in the foregoing embodiment. The communication device further receives the packet 4 and the packet 5, determines that the packet 4 corresponds to the type C service priority and the packet 5 corresponds to the type C service priority, and buffers the packet 4 in the queue 5, and the packet 5 in the queue 6 based on the method for selecting a queue for the packet of the type C service priority in the foregoing embodiment.

In a forwarding periodicity, the packet 1 is first forwarded, and the packet 1 corresponds to a base frame 1 in the multiframe. Then, the packet 2 is forwarded, and the packet 2 corresponds to a base frame 2 in the multiframe. Then, the packet 3 is forwarded, and the packet 3 corresponds to a base frame 3 in the multiframe. Then, because the queue 4 is empty, forwarding duration of a packet is waited for in the queue 4. Correspondingly, because no packet is forwarded within the forwarding duration of the packet, a base frame 4 in the multiframe does not have a corresponding packet. Then, the packet 4 is forwarded, and the packet 4 corresponds to a base frame 5 in the multiframe. In addition, a queue weight of the queue 5 is 2 and the scheduling granularity is 1. In other words, the queue 5 should forward two packets, but the queue 5 only includes the packet 4. Therefore, the forwarding duration of a packet further needs to be waited for in the queue 5. Correspondingly, because no packet is forwarded within the forwarding duration of the packet, a base frame 6 in the multiframe does not have a corresponding packet. Then, the packet 5 is forwarded, and the packet 5 corresponds to a base frame 7 in the multiframe. In addition, based on a same reason why the basic frame 6 does not have the corresponding packet, the basic frame 8 also does not have a corresponding packet, and based on a same reason why the basic frame 4 does not have the corresponding packet, the basic frames 9, 10, 11, and 12 also do not have corresponding packets.

With reference to the example, it can be learned that, according to the packet forwarding processing in an embodiment of the application, packets of various service priorities may be in a corresponding area range of the multiframe when being forwarded. A higher service priority indicates that a location of a corresponding packet in the multiframe is nearer to the front. A forwarding effect is shown in FIG.

7. Locations of packets in the multiframe are successively a packet of a type A service priority, a packet of a type B service priority, and a packet of a type C service priority. A priority order of the service priorities is as follows: a type A service priority>a type B service priority>a type C service priority.

Figure 8:
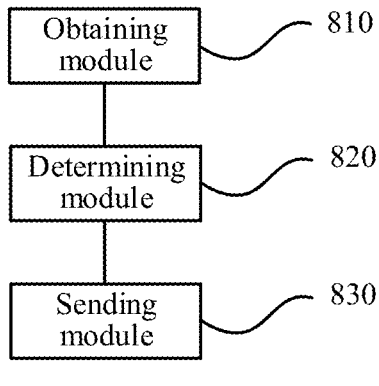
FIG. 8 is a schematic structural diagram of a parameter configuration apparatus according to an embodiment of this application.

Based on a same technical conception, an embodiment of this application further provides a parameter configuration apparatus. The apparatus may be the controller in the foregoing embodiments. As shown in FIG. 8, the apparatus includes:

An obtaining module 810 is configured to obtain a data transmission quality parameter of a service, and obtain a forwarding capability parameter of a communication device. In an embodiment, an obtaining function in the foregoing operations 201 and 202 and another implicit operation may be implemented.

A determining module 820 is configured to determine a configuration parameter of the communication device based on the data transmission quality parameter and the forwarding capability parameter. In an embodiment, a determining function in the foregoing operation 203 and another implicit operation may be implemented.

A sending module 830 is configured to send the configuration parameter to the communication device. In an embodiment, a sending function in the foregoing operation 204 and another implicit operation may be implemented.

In an embodiment, the configuration parameter includes one or more of a preset packet length, a correspondence between the service and a service priority, and a queue configuration parameter.

In an embodiment, the queue configuration parameter includes one or more of a base frame length, a multiframe length, a service volume proportion corresponding to the service priority, and a quantity of queues. The base frame length indicates a maximum length of a packet forwarded by a queue at a time, and a multiframe length indicates a maximum length of a packet forwarded by all queues in a forwarding periodicity.

In an embodiment, the queue configuration parameter includes one or more of a forwarding periodicity length, a time slice length, a time slice quantity, a queue weight, and a queue shaping parameter.

In an embodiment, the data transmission quality parameter includes an upper latency limit and an upper jitter limit.

In an embodiment, the forwarding capability parameter includes a bandwidth of an egress port and/or a quantity of queues on the egress port.

In an embodiment, the determining module 820 is configured to:

determine the service priority of the service based on the upper latency limit of the service and the upper jitter limit of the service; and determine the queue configuration parameter of the communication device based on the upper latency limit corresponding to the service priority, the upper jitter limit corresponding to the service priority, the bandwidth of the egress port of the communication device, and the preset packet length.

It should be noted that, when the parameter configuration apparatus provided in the foregoing embodiment configures a parameter, division of the foregoing functional modules is merely used as an example for description. In actual application, the foregoing functions may be allocated to different functional modules for implementation based on an actual need, in other words, an internal structure of the controller is divided into different functional modules, to implement all or some of the functions described above. In addition, the parameter configuration apparatus provided in the foregoing embodiment is based on a same conception as the parameter configuration method embodiments. For an implementation process, refer to the method embodiments. Details are not described herein again.

Figure 9:
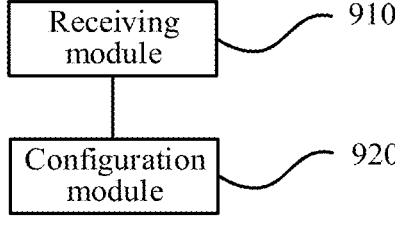
FIG. 9 is another schematic structural diagram of a parameter configuration apparatus according to an embodiment of this application.

Based on a same technical conception, an embodiment of this application further provides a parameter configuration apparatus. The apparatus may be the communication device in the foregoing embodiments. As shown in FIG. 9, the apparatus includes:

A receiving module 910 is configured to receive a configuration parameter sent by a controller. The configuration parameter includes one or more of a preset packet length, a correspondence between a service and a service priority, and a queue configuration parameter. In an embodiment, a receiving function in the foregoing operation 204 and another implicit operation may be implemented.

A configuration module 920 is configured to perform configuration based on the configuration parameter. In an embodiment, a configuration function in the foregoing operation 205 and another implicit operation may be implemented.

It should be noted that, when the parameter configuration apparatus provided in the foregoing embodiment configures a parameter, division of the foregoing functional modules is merely used as an example for description. In actual application, the foregoing functions may be allocated to different functional modules for implementation based on an actual need, in other words, an internal structure of a communication device is divided into different functional modules, to implement all or some of the functions described above. In addition, the parameter configuration apparatus provided in the foregoing embodiment is based on a same conception as the parameter configuration method embodiments. For an implementation process, refer to the method embodiments. Details are not described herein again.

FIG. 10 is a schematic structural diagram of a communication device 1000 according to an embodiment of this application.

The communication device 1000 includes a main control board 1010 and an interface board 1030.

The main control board is also referred to as a main processing unit (MPU) or a route processor card. The main control board 1010 is configured to control and manage components in the communication device 1000, including route computation, device management, device maintenance, and protocol processing functions. The main control board 1010 includes a central processing unit 1011 and a memory 1012.

The interface board 1030 is also referred to as a line processing unit (LPU) card, a line card, or a service board. The interface board 1030 is configured to provide various service interfaces and implement data packet forwarding. The service interface includes but is not limited to an Ethernet interface, a packet over SONET/SDH (POS) interface, and the like. The Ethernet interface is, for example, a flexible Ethernet service interface (FlexE client). The interface board 1030 includes a central processing unit 1031, a network processor 1032, a forwarding entry memory 1034, and a physical interface card (PIC) 1033.

The central processing unit 1031 on the interface board 1030 is configured to control and manage the interface board 1030 and communicate with the central processing unit 1011 on the main control board 1010.

The network processor 1032 is configured to implement packet forwarding processing. A form of the network processor 1032 is, for example, a forwarding chip. In an embodiment, the network processor 1032 is configured to forward a received packet based on a forwarding table stored in the forwarding entry memory 1034. If a destination address of the packet is an address of the communication device 1000, the network processor 1032 sends the packet to a CPU (for example, the central processing unit 1011) for processing. If the destination address of the packet is not the address of the communication device 1000, the network processor 1032 searches, based on the destination address, the forwarding table for a next hop and an outbound interface corresponding to the destination address, and forwards the packet to the outbound interface corresponding to the destination address. Processing of an uplink packet includes processing of a packet ingress interface and forwarding table lookup, and processing of a downlink packet includes forwarding table lookup and the like.

The physical interface card 1033 is configured to implement a physical layer interconnection function. Original traffic enters the interface board 1030 from the physical interface card 1033, and a processed packet is sent out from the physical interface card 1033. The physical interface card 1033, also referred to as a subcard, may be mounted on the interface board 1030, and is responsible for converting an optical/electrical signal into a packet, performing validity check on the packet, and forwarding the packet to the network processor 1032 for processing. In some embodiments, the central processing unit may alternatively perform a function of the network processor 1032, for example, implement software forwarding based on a general CPU. Therefore, the network processor 1032 is not necessary in the physical interface card 1033.

In an embodiment, the communication device 1000 includes a plurality of interface boards. For example, the communication device 1000 further includes an interface board 1040, and the interface board 1040 includes a central processing unit 1041, a network processor 1042, a forwarding entry memory 1044, and a physical interface card 1043.

In an embodiment, the communication device 1000 further includes a switching board 1020. The switching board 1020 may also be referred to as, for example, a switch fabric unit (SFU). When the network device includes a plurality of interface boards 1030, the switching board 1020 is configured to complete data exchange between the interface boards. For example, the interface board 1030 and the interface board 1040 communicate with each other by using the switching board 1020.

The main control board 1010 is coupled to the interface board 1030. For example, the main control board 1010, the interface boards 1030 and 1040, and the switching board 1020 are connected to a system backplane through a system bus to communicate with each other. In an embodiment, an inter-process communication (IPC) channel is established between the main control board 1010 and the interface board 1030, and the main control board 1010 communicates with the interface board 1030 through the IPC channel.

Logically, the communication device 1000 includes a control plane and a forwarding plane. The control plane includes the main control board 1010 and the central processing unit 1031. The forwarding plane includes components that perform forwarding, such as the forwarding entry memory 1034, the physical interface card 1033, and the network processor 1032. The control plane performs functions such as routing, generating a forwarding table, processing signaling and a protocol packet, and configuring and maintaining a device status. The control plane delivers the generated forwarding table to the forwarding plane. On the forwarding plane, based on the forwarding table delivered from the control plane, the network processor 1032 looks up the table, and forwards a packet received by the physical interface card 1033. For example, the forwarding table delivered by the control plane is stored in the forwarding entry memory 1034. In some embodiments, for example, the control plane and the forwarding plane are completely separated, and are not on a same device.

Operations performed on the interface board 1040 are consistent with operations performed on the interface board 1030. For brevity, details are not described. The communication device 1000 in an embodiment may correspond to the edge device or the forwarding device in the foregoing method embodiments. The main control board 1010, the interface board 1030, and/or the interface board 1040 in the communication device 1000 implement, for example, functions of the edge device or the forwarding device in the foregoing method embodiments and/or various operations implemented by the edge device or the forwarding device. For brevity, details are not described herein again.

It should be noted that there may be one or more main control boards. When there are a plurality of main control boards, the main control boards may include, for example, an active main control board and a standby main control board. There may be one or more interface boards. A network device having a stronger data processing capability provides more interface boards. There may also be one or more physical interface cards on the interface board. There may be no switching board or one or more switching boards. When there are a plurality of switching boards, load balancing and redundancy backup may be implemented together. In a centralized forwarding architecture, the network device may not need the switching board, and the interface board provides a function of processing service data of an entire system. In a distributed forwarding architecture, the network device may have at least one switching board, and data exchange between a plurality of interface boards is implemented by using the switching board, to provide a large-capacity data exchange and processing capability. Therefore, a data access and processing capability of a network device in the distributed architecture is better than that of a device in the centralized architecture. In an embodiment, the network device may alternatively be in a form in which there is only one card. For example, there is no switching board, and functions of the interface board and the main control board are integrated on the card. In this case, the central processing unit on the interface board and the central processing unit on the main control board may be combined into one central processing unit on the card, to perform functions obtained by combining the two central processing units. The device in this form (for example, a network device such as a low-end switch or router) has a weak data exchange and processing capability. An architecture that is to be used depends on a networking deployment scenario. This is not limited herein.

FIG. 11 is a schematic structural diagram of a controller 1100 according to an embodiment of this application.

The controller 1100 may include a processor 1101, a memory 1102, a communication component 1103, and the like.

The processor 1101 may be a central processing unit (CPU), and may be configured to perform processing of steps 202 and 203 shown in FIG. 2.

The memory 1102 may be various volatile memories or non-volatile memories, for example, a solid-state drive (SSD) or a dynamic random access memory (DRAM). The memory may be configured to store a data transmission quality parameter of a service and a forwarding capability parameter of a communication device.

The communication component 1103 may be a wired network connector, a wireless fidelity (Wi-Fi) module, a Bluetooth module, a honeycomb network communication module, or the like. The communication component may be configured to perform data transmission with another device, and the another device may be a communication device and user equipment. For example, the communication component may perform processing of steps 201 and 204 shown in FIG. 2.

In the foregoing embodiments, all or a part of the software, hardware, firmware, or any combination thereof may be implemented. When the software is used for implementation, all or a part of the implementation may be implemented in a form of a computer program product. The computer program product includes one or more computer instructions. When the computer program instructions are loaded and executed on a device, all or some of the procedures or functions are generated according to embodiments of this application. The computer instructions may be stored in a computer-readable storage medium or may be transmitted from a computer-readable storage medium to another computer-readable storage medium. For example, the computer instructions may be transmitted from a web site, computer, server, or data center to another website, computer, server, or data center in a wired (for example, a coaxial optical cable, an optical fiber, or a digital subscriber line) or wireless (for example, infrared, radio, or microwave) manner. The computer-readable storage medium may be any usable medium accessible by a device, or a data storage device such as a server or a data center, integrating one or more usable media. The usable media may be a magnetic medium (for example, a floppy disk, a hard disk drive, or a magnetic tape), an optical medium (for example, a digital video disk (DVD)), or a semiconductor medium (for example, a solid-state drive).

One of ordinary skilled in the art may understand that all or some of the steps of the embodiments may be implemented by hardware or a program instructing related hardware. The program may be stored in a computer-readable storage medium. The storage medium may be a read-only memory, a magnetic disk, an optical disc, or the like.

The foregoing descriptions are merely embodiments of this application, but are not intended to limit this application. Any modification, equivalent replacement, or improvement made without departing from the spirit and principle of this application should fall within the protection scope of this application.

What is claimed is:

1. A parameter configuration method, comprising:
obtaining a data transmission quality parameter of a service;
obtaining a forwarding capability parameter of a communication device;
determining a configuration parameter of the communication device based on the data transmission quality parameter and the forwarding capability parameter, wherein the forwarding capability parameter comprises a quantity of queues on an egress port, wherein the data transmission quality parameter comprises an upper jitter limit, wherein the upper jitter limit refers to a maximum jitter allowed by the service, wherein the determining the configuration parameter of the communication device based on the data transmission quality parameter and the forwarding capability parameter comprises:

determining a service priority of the service based on the upper jitter limit of the service; and determining a queue configuration parameter of the communication device based on the upper jitter limit corresponding to the service priority; and sending the configuration parameter to the communication device, wherein the configuration parameter comprises a preset packet length and a correspondence between the service and the service priority.

2. The method according to claim 1, wherein the configuration parameter further comprises the queue configuration parameter.

3. The method according to claim 2, wherein the queue configuration parameter comprises one or more of a base frame length, a multiframe length, or a service volume proportion corresponding to the service priority, wherein the base frame length indicates a maximum length of a packet forwarded by a queue at a time, and a multiframe length indicates a maximum length of a packet forwarded by all queues in a forwarding periodicity.

4. The method according to claim 2, wherein the queue configuration parameter comprises one or more of a forwarding periodicity length, a time slice length, a time slice quantity, a queue weight, a quantity of queues that corresponds to the service priority, or a queue shaping parameter.

5. The method according to claim 1, wherein the data transmission quality parameter comprises an upper latency limit.

6. The method according to claim 5, wherein the forwarding capability parameter further comprises a bandwidth of the egress port.

7. The method according to claim 6, wherein the determining the configuration parameter of the communication device based on the data transmission quality parameter and the forwarding capability parameter comprises:

determining the service priority of the service based on the upper latency limit of the service; and determining the queue configuration parameter of the communication device based on the upper latency limit corresponding to the service priority, the bandwidth of the egress port of the communication device, and a preset packet length.

8. A parameter configuration method applied to a communication device, comprising:

receiving a configuration parameter sent by a controller, wherein the configuration parameter comprises a preset packet length, a correspondence between a service and a service priority, and a queue configuration parameter, wherein the configuration parameter of the communication device is determined based on a data transmission quality parameter and a forwarding capability parameter, wherein the forwarding capability parameter comprises a quantity of queues on an egress port, wherein the data transmission quality parameter comprises an upper jitter limit, the upper jitter limit refers to a maximum jitter allowed by the service, the service priority of the service is determined based on the upper jitter limit of the service, and the queue configuration parameter of the communication device is determined based on the upper jitter limit corresponding to the service priority; and performing configuration based on the configuration parameter.

9. The method according to claim 8, wherein the queue configuration parameter comprises one or more of a base frame length, a multiframe length, or a service volume proportion corresponding to the service priority, wherein the base frame length indicates a maximum length of a packet forwarded by a queue at a time, and a multiframe length indicates a maximum length of a packet forwarded by all queues in a forwarding periodicity.

10. The method according to claim 8, wherein the queue configuration parameter comprises one or more of a forwarding periodicity length, a time slice length, a time slice quantity, a queue weight, a quantity of queues that corresponds to the service priority, or a queue shaping parameter.

11. The method according to claim 8, wherein the data transmission quality parameter comprises an upper latency limit.

12. The method according to claim 8, wherein the forwarding capability parameter further comprises a bandwidth of the egress port.

13. A controller, comprising:

a processor, and a memory coupled with the processor to store instructions, when executed by the processor, cause the controller to:

obtain a data transmission quality parameter of a service, and obtain a forwarding capability parameter of a communication device;

determine a configuration parameter of the communication device based on the data transmission quality parameter and the forwarding capability parameter, wherein the forwarding capability parameter comprises a quantity of queues on an egress port, wherein the data transmission quality parameter comprises an upper jitter limit, wherein the upper jitter limit refers to a maximum jitter allowed by the service, determining a service priority of the service based on the upper jitter limit of the service; and determining a queue configuration parameter of the communication device based on the upper jitter limit corresponding to the service priority; and send the configuration parameter to the communication device, wherein the configuration parameter comprises a preset packet length and a correspondence between the service and the service priority.

14. The controller according to claim 13, wherein the configuration parameter further comprises the queue configuration parameter.

15. The controller according to claim 14, wherein the queue configuration parameter comprises one or more of a base frame length, a multiframe length, or a service volume proportion corresponding to the service priority, wherein the base frame length indicates a maximum length of a packet forwarded by a queue at a time, and a multiframe length indicates a maximum length of a packet forwarded by all queues in a forwarding periodicity.

16. The controller according to claim 14, wherein the queue configuration parameter comprises one or more of a forwarding periodicity length, a time slice length, a time slice quantity, a queue weight, a quantity of queues that corresponds to the service priority, or a queue shaping parameter.

17. The controller according to claim 16, wherein the data transmission quality parameter comprises an upper latency limit.

18. The controller according to claim 17, wherein the forwarding capability parameter further comprises a bandwidth of the egress port.

19. The controller according to claim 18, wherein the instructions when executed by the processor further cause the controller to:

determine the service priority of the service based on the upper latency limit of the service; and determine the queue configuration parameter of the communication device based on the upper latency limit corresponding to the service priority, the bandwidth of the egress port of the communication device, and the preset packet length.

20. A communication device, comprising:

a processor, and a memory coupled with the processor to store instructions, when executed by the processor, cause the communication device to:

receive a configuration parameter sent by a controller, wherein the configuration parameter comprises a preset packet length, a correspondence between a service and a service priority, and a queue configuration parameter, wherein the configuration parameter of the communication device is determined based on a data transmission quality parameter and a forwarding capability parameter, wherein the forwarding capability parameter comprises a quantity of queues on an egress port, wherein the data transmission quality parameter comprises an upper jitter limit, wherein the upper jitter limit refers to a maximum jitter allowed by the service, the service priority of the service is determined based on the upper jitter limit of the service, and the queue configuration parameter of the communication device is determined based on the upper jitter limit corresponding to the service priority; and perform configuration based on the configuration parameter.

* * * * *